Aug. 19, 1969    D. F. NELSON ET AL    3,462,211
SEMICONDUCTOR JUNCTION ELECTRO-OPTIC LIGHT MODULATOR
Filed Sept. 22, 1965    2 Sheets-Sheet 1
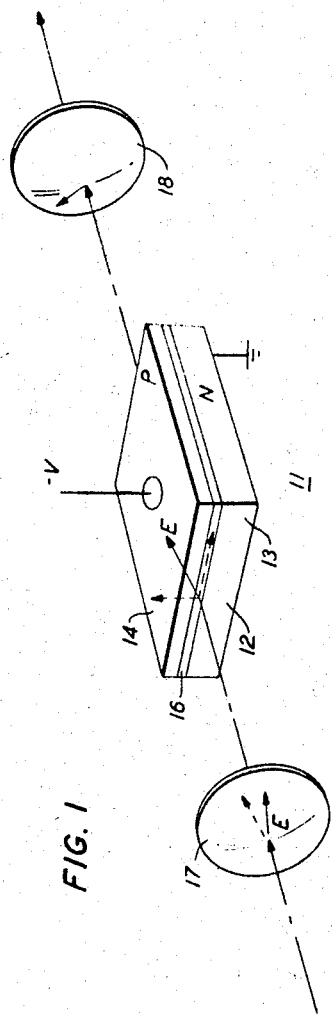
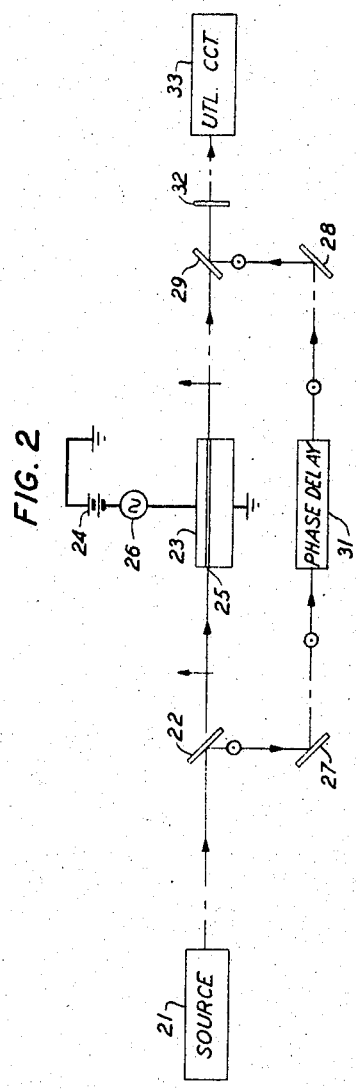
INVENTORS D. F. NELSON
F. K. REINHART
BY
ATTORNEY – # United States Patent Office 3,462,211
Patented Aug. 19, 1969

3,462,211
SEMICONDUCTOR JUNCTION ELECTRO-OPTIC LIGHT MODULATOR
Donald F. Nelson and Franz K. Reinhart, Summit, N.J., assignors to Bell Telephone Laboratories, Incorporated, New York, N.Y., a corporation of New York
Filed Sept. 22, 1965, Ser. No. 489,340
Int. Cl. G02f 1/26, 1/28, 1/36
U.S. Cl. 350—150                 12 Claims

ABSTRACT OF THE DISCLOSURE

Described herein is an optional modulation system including a p-n junction in a semiconductor, in which the crystallographic orientation of the semiconductor is such that the phase shifts produced by the electro-optic effect and the waveguide effect are additive; thereby the phase modulation is enhanced.

---

This invention relates to the modulation of electromagnetic radiation in the optical frequency range, and, more particularly, to such modulation utilizing semiconductor devices characterized by having a junction that separates regions of different conductivity type.

In the copending United States application Ser. No. 377,367 of A. Ashkin and M. Gershenzon, filed June 23, 1964, now United States Patent 3,301,625, issued on Jan. 31, 1967, there is disclosed a number of light modulation arrangements utilizing the effects on a light wave of the depletion layer of a p-n junction device under the influence of reverse bias and modulating electric fields. The present application discloses a number of light modulation arrangements utilizing the electro-optic effect in semiconductors in addition to the effects disclosed in the aforesaid application of A. Ashkin and M. Gershenzon.

One effect of the depletion layer under reverse bias is that it acts as a planar waveguide for light directed along the junction, and the width of this waveguide varies with variations in applied voltage. This variation in width of the junction produces phase shifts in the guided wave; hence a form of phase modulation of the light is produced when the voltage applied across the junction includes a signal voltage.

Another effect of the depletion layer on a light wave passing through the junction is a phase shift with variations in applied voltage resulting from an electro-optic effect in the junction. This effect produces an elliptical polarization of the light wave when, upon entering the junction, it is polarized other than perpendicularly or parallel to the electro-optically induced optic axis which for simple crystallographic orientations is perpendicular or parallel to the junction plane. The resultant elliptically polarized wave can readily be converted to an amplitude modulated wave by means of an appropriately oriented polarizing filter at the output of the junction. Because the phase modulation resulting from the changes in junction width is polarization insensitive, it contributes nothing to the polarization modulation of the wave.

In general, modulations of the types discussed in the foregoing, in order to be of practical use, require a junction that is many wavelengths long. Because of the dependence of the upper limits of modulating frequencies on transmit time, as well as because of fabrication problems, it is desirable to minimize the length of the diode. It is, therefore, desirable that some means be found to enhance the modulation effects in a junction of any particular length.

The present invention is directed toward enhancing these modulation effects while, at the same time, preserving the advantages of polarization modulation, which, as pointed out heretofore, is easily converted to amplitude modulation. This is accomplished by making use of the phase changes produced by changes in junction width and by the electro-optic effect simultaneously. In the context of this disclosure, "junction" includes not only p-n junctions, but other junctions giving rise to a depletion layer, such as, for example, a barrier layer device.

In an illustrative embodiment of the invention, a light beam to be modulated is split into two portions, one portion having a vertical polarization and the other having a horizontal polarization. That portion having the vertical polarization is directed into a p-n junction device for travel through the junction "waveguide," with its electric vector parallel to a reverse bias applied across the junction, and to the field of an applied modulating voltage. The crystallographic orientation of the junction device is such that the phase change resulting from the electro-optic effect in the junction is in the same direction as the phase change resulting from the changes in junction width. As a consequence, the phase shifts are additive, and the beam emerging from the junction is a vertically polarized, phase modulated beam.

The horizontally polarized portion of the beam is directed around the junction and recombined with the vertically polarized portion at the output of the junction. The reconstituted beam is an elliptically polarized beam. When this beam is passed through a suitably oriented polarizer, an amplitude modulated beam results. Because the two phase modulating effects of the junction were used, the resulting amplitude modulation for a given applied modulating voltage is materially greater than if either effect had been used alone.

In a preferred embodiment of the invention, the unmodulated portion of the beam, i.e., the horizontally polarized portion, is passed through a phase delay element which compensates for the phase delay produced on the modulated portion of the beam in the absence of modulation as it passes through the crystal. This latter element is unnecessary when the coherence length of the light beam is considerably greater than the optical path length between beam splitting and recombining.

In a second illustrative embodiment of the invention, one end of the junction device is coated with a reflective coating so that the beam is reflected back through the diode, after which it is combined with the unmodulated portion of the beam to produce an elliptically polarized beam. The reflection of the beam has the effect of doubling the length of the junction, thereby producing a doubling of the modulation. For this form of modulation, the total length of the paths of the beam through the crystal must be sufficiently short so that the total transit time of the beam is much less than one period of oscillation of the modulation frequency.

In a variation of the second embodiment, both ends of the diode are coated with reflective coatings, thereby causing multiple passages of the beam through the diode.

In a variation of the first illustrative embodiment of the invention the two portions of the beam have parallel polarizations. When these two portions are combined at the output of the junction, an amplitude modulated wave is the result.

It is a feature of all of the embodiments of the invention that the light beam to be modulated is first split into two portions, one of which is passed through the junction device under the influence of a modulating voltage, and the other of which remains unmodulated, and that the two portions are recombined to produce a modulated beam..

The principles and features of the present invention will be more readily apparent from the following detailed description, taken in conjunction with the accompanying drawings, in which:

FIG. 1 is a perspective view of a prior art type modulation arrangement;

FIG. 2 is a diagrammatic view of a first illustrative embodiment of the invention;

Figure 3:
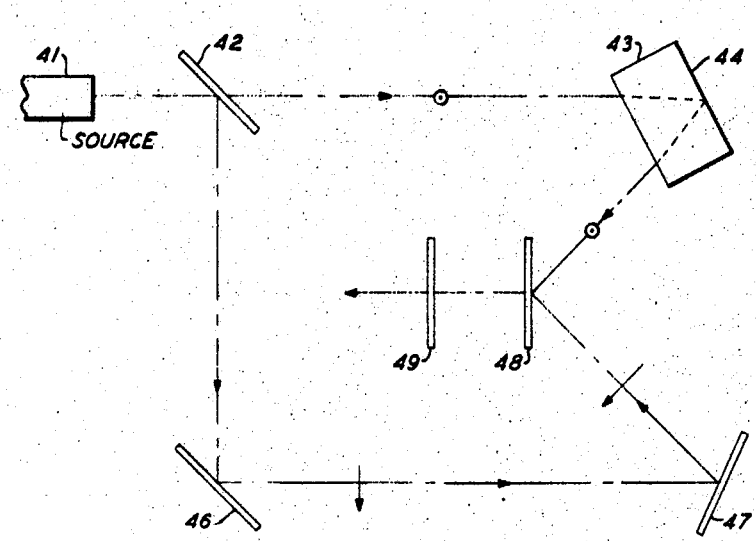
FIG. 3 is a diagrammatic plan view of a second illustrative embodiment.

In FIG. 1 there is shown, for purposes of illustration, a p-n junction diode modulation arrangement 11 utilizing the electro-optic effect of the junction to produce polarization modulation. The system 11 comprises a diode 12 of gallium phosphide for example, having zones 13, 14 of N-type and P-type conductivity, respectively, forming a planar junction 16. A light beam from a source, not shown, is directed through a polarizer 17 into junction 16 for travel therethrough. Diode 12 is supplied with a reverse bias —v. from a source, not shown.

The linear electro-optic effect changes a material such as optically isotropic gallium phosphide into a uniaxial or biaxial crystal in the region of applied electric field depending on the orientation of the electric field in the crystal. If the electric field is oriented in the [111] direction, a uniaxial crystal results with its optic axis aligned with the electric field. The crystal in the electric field region is then characterized by two refractive indices:

$$n_\perp = n\left(1 + \frac{Ern^2}{2\sqrt{3}}\right) \quad (1)$$

and $$n_{||} = n\left(1 - \frac{Ern^2}{\sqrt{3}}\right) \quad (2)$$

where
$n_\perp$ is the ordinary index of refraction,
$n_{||}$ is the extraordinary index, $n$ the normal index, $E$ the electric field, and $r$ the electro-optic coefficient.

If the electric field is varied, the index of refraction and hence the phase of a light wave is modulated. If the light travels perpendicularly to the optic axis, then two waves can propagate superposed in space at different velocities.

In FIG. 1, the light is directed into junction 16 for travel perpendicular to the optic axis, with its electric field E oriented at 45° to the plane of the junction by polarizer 17. After traversing a distance $l$, there will be a phase difference $\Delta\varphi$ between the two components of the wave. The phase difference between the two components of the wave is approximately 90° at a wavelength of 6238 A. for a diode 0.06 cm. long and a voltage of 31 volts. For a wavelength of 5460 A., the shift is as much as 140° for a reverse bias of only 31 volts.

Since the phase difference is dependent on the applied voltage when a modulating signal is applied across the diode, an elliptically polarized light beam emerges from the diode and is readily converted to an amplitude modulated beam by a polarizer 18.

While phase modulation due to the electro-optic effect is occurring in the diode, phase modulation due to the variations in width of the waveguide with applied voltage is also taking place. However, since this latter type of modulation is polarization insensitive, both components of the wave are phase modulated equally, and, in the arrangement of FIG. 1, there is no effect on the amplitude modulation envelope. In FIG. 2 there is shown an illustrative embodiment of the invention which takes advantage of both types of modulation, thereby materially increasing the degree of modulation for a given diode length and applied voltage.

In the embodiment of FIG. 2 a light beam to be modulated is directed from a suitable source 21 into a beam splitter 22. Beam splitter 22 may take any one of a number of suitable forms known in the art. Its function is to divide the beam into two equal parts that are orthogonally polarized relative to each other. It is to be understood, of course, that polarizers may be used, if desired, or other suitable means, so long as the output of the splitter comprises two orthogonally polarized beams directed along different paths. In the arrangement of FIG. 2, a portion of the split beam is directed into the planar junction 25 of a junction diode 23 of suitable material such as gallium phosphide, gallium arsenide, or the like, in which both the electro-optic effect and the waveguiding effect are present. For greatest efficiency of coupling of the beam into the junction, various arrangements may be used. A cylindrical lens which forms the beam into a thin flat sheet may be used, or a light conducting fibre arrangement, or various combinations of lenses and fibres might be used with the object of coupling as much as possible of the beam energy into the junction. In addition, antireflection coatings may be used.

Diode 23 is reverse biased by a voltage source 24, and a suitable source 26 of modulating voltage applies modulating voltages to the diode. While reverse bias has been shown here, it is also possible to use forward bias in a range where the diode current is negligible. For purposes of illustration only, diode 23 has a (111) crystallographic orientation which results in the optic axis being parallel to the applied fields and normal to the direction of propagation of the light beam through the junction. In this case, that portion of the beam directed into the junction should be polarized parallel to the electric fields. In FIG. 2 it is shown as having a polarization parallel to the applied fields. The modulating voltages from source 26 act to vary the width of the dielectric waveguide formed by the junction 25, and, as a consequence, vary the phase of the light beam being guided along the junction. At the same time, the modulating voltages vary the index of refraction of the junction by means of the electro-optic effect, thereby varying the phase of the light beam. In the arrangement of FIG. 2, these two effects are additive, so that the output of the junction is a light beam having a phase modulation substantially greater than that which would be produced by either effect acting alone.

While one portion of the beam is directed through the junction 25, the other portion of the beam, orthogonally polarized relative to the first portion, is directed along a path around the junction by suitable means such as mirrors or prisms 27, 28, and is recombined with the output beam from diode 23 by a suitable recombining means 29. The two portions of the beam arriving at means 29 differ not only in polarization, but in phase also. The phase difference is a result of three separate effects. The portion of the beam passing through the diode has been phase modulated by both the electro-optic effect and the varying waveguide effect, as discussed heretofore, and has also undergone a phase shift relative to the second portion of the beam as a result of passing through the diode while the second portion simply passed through air. This latter effect is inconsequential if the diode length is short relative to the coherence length of the beam. Where it is desired to counteract this effect, a suitable phase delay means 31 may be introduced into the path of the second portion of the beam, or that portion may be directed through the diode along a path removed from the junction.

The output of the recombining means 29 is an elliptically polarized wave, as a consequence of the varying phase difference between the two portions of the wave entering the means 29. This elliptically polarized wave passes through a polarizer 32 and emerges as an amplitude modulated beam, the depth or degree of modulation of which is materially greater than the amplitude modulation produced in the arrangement of FIG. 1. This amplitude modulated beam then passes to a suitable utilization device 33.

In FIG. 3 there is shown in plan view a modulation arrangement similar to that of FIG. 2 but in which the modulation effect is substantially doubled.

A light beam from a source 41 is directed into a beam splitter 42. A portion of the split beam is then directed at an angle into the junction of a suitable modulation diode 43, preferably having a [111] crystallographic orientation so that the optic axis is normal to the plane of the drawing. With such an orientation, the entrance angle of the beam is not critical. The rear face 44 of diode 43 is coated with a reflecting coating so that the beam is reflected out of the diode at an angle, as shown. As a consequence, the effective length of the beam path in the diode is more than double that of the arrangement of FIG. 2, with a corresponding increase in the modulation of the beam. For simplicity, the various electrical connections to the diode have not been shown.

The other portion of the split beam is directed along a path by means of suitable members 46 and 47 to a recombiner 48 where it is recombined with the beam portion emerging from the diode. As was the case in the arrangement of FIG. 2, a phase delay means, not shown, may be inserted in the path of the unmodulated portion of the beam to compensate for any constant phase delay resulting from passage of the other portion through the diode.

The output of the recombining means is an elliptically polarized wave which is converted to an amplitude modulated wave by means of a polarizer 49.

Figure 4:
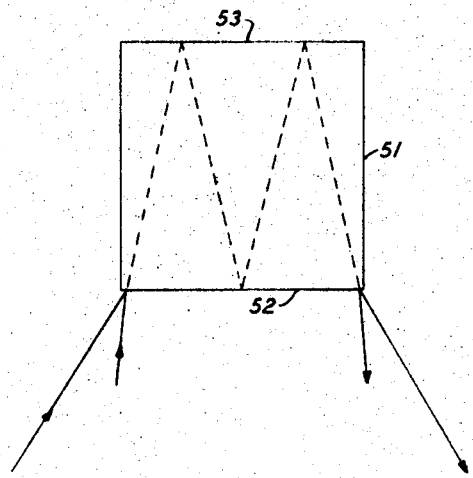
FIG. 4 is a diagrammatic plan view of a modification of the arrangement of FIG. 3.

The arrangement of FIG. 3 may be adapted to multiple reflections of the beam in the diode, as shown in FIG. 4. The diode 51 of FIG. 4 has both the front surface 52 and the rear surface 53 coated with a reflecting coating. The beam is introduced at an angle into the diode through a transparent window, for example. After undergoing multiple reflections from the surfaces 52 and 53, the beam exits through the diode through, for example, an exit window. While it is possible to have the beam reflected several times, the total transit time of the beam through the diode must be less than a period of the modulating signal. Thus, the frequency of the modulating signal governs the number of reflections that can be made. In the arrangement of FIG. 4, the unmodulated portion of the beam may be made to undergo a corresponding number of reflections, a longer path length, or a suitable phase delay so that it arrives at the recombining means with no phase difference relative to the modulated beam portion resulting from its phase delay in passing through the diode.

Thus far the principles of the invention have been illustrated in a number of embodiments wherein there is an elliptical polarization of the beam which is converted to amplitude modulation. It is also possible to produce amplitude modulation directly using the physical arrangement of FIGS. 2 or 3 with the only differences that the two portions of the beam have the same polarization instead of an orthogonal polarization and no output polarizer is needed. That portion of the beam which passes through the diode may be represented by the term $$A \cos (\omega t + \varphi(t)) \quad (3)$$

where $A$ is the amplitude of the wave, $\omega$ its angular frequency, $t$ the time, and $\varphi(t)$ the phase modulation component. The unmodulated portion is represented by $$A \cos \omega t \quad (4)$$

When these two portions are combined, the result is $$A \cos (\omega t + \varphi(t)) + A \cos \omega t = \left[ 2A \cos \frac{\varphi(t)}{2} \right] \cos \left( \omega t + \frac{\varphi(t)}{2} \right) \quad (5)$$

The first term in brackets on the right-hand side of Equation 5 is an amplitude modulation of the wave, hence the beam may be fed directly to an amplitude modulation detector without being passed through a polarizer.

The foregoing embodiments have been shown to illustrate the principles of the invention. Various modifications or other embodiments may occur to workers in the art. For example, the invention has been shown in embodiments using isotropic materials such as gallium phosphide or gallium arsenide which are made anisotropic upon application of an electric field. With such materials various crystallographic orientations may be used. It is also possible that materials which are initially anisotropic might be used. In addition, the invention has been shown in embodiments utilizing the linear electro-optic effect. It is possible also that other electro-optic effects might be used such as, for example, the quadratic electro-optic effect.

Non-piezoelectric materials such as silicon and germanium, for example, which exhibit a pronounced junction waveguide effect may also be used.

These and various other possibilities may occur to workers in the art without departure from the spirit and scope of the invention.

What is claimed is:

1. In a device for modulating a beam of light:
   a semiconductor member having a junction therein which exhibits an electro-optic effect, said member being located in the path of the beam of light such that the beam propagates along said junction; and said member having a crystallographic orientation with respect to an electric field applied to the junction such that under the influence of the electric field a phase change in the beam along said junction, resulting from the electro-optic effect in the junction caused by said electric field, is in the same direction as a phase change in the beam along said junction, resulting from the waveguide effect of the change in the width of the junction caused by said applied electric field; so that these phase changes in the beam are additive.

2. In a device for modulating a beam of light:
   a semiconductor member having a junction therein which exhibits an electro-optic effect, said member being located in the path of the beam of light so that the beam propagates along said junction, and said member having a crystallographic orientation with respect to the propagation direction of the beam along the junction such that under the influence of an applied voltage across the junction the optic axis induced by the electric field of said voltage is normal to said propagation direction, so that a phase change in the beam resulting from the electro-optic effect in the junction is in the same direction as a phase change in the beam resulting from the waveguide effect of the change in the width of the junction.

3. The device recited in claim 2 in which said semiconductor member is essentially gallium arsenide.

4. The device recited in claim 2 in which said semiconductor member is essentially gallium phosphide.

5. A device for modulating a beam of light which comprises:
   (a) a semiconductor member according to claim 2;
   (b) means for applying a reverse bias voltage across said junction; and
   (c) means for applying a modulating signal voltage across said junction in the semiconductor member, whereby the beam undergoes a phase change according to the signal as the beam propagates along the junction.

6. The device recited in claim 5 which further includes polarizing means for polarizing the beam of light in a direction parallel to the electric field produced in the junction by the bias voltage, said polarizing means being located in the path of said beam of light in order to polarize the beam prior to its propagating along said junction.

7. A light modulation system which comprises:
   (a) means for providing first and second mutually coherent beams of light;

(b) a semiconductor member having a junction therein which exhibits an electro-optic effect, said member located in the path of the first beam of light such that only said first beam propagates along said junction, and said member having a crystallographic orientation with respect to the propagation direction of the beam along the junction such that under the influence of an applied voltage across the junction the optic axis induced by the electric field of said voltage is normal to said propagation direction, so that a phase change in the beam resulting from the electro-optic effect in the junction is in the same direction as a phase change in the beam resulting from the waveguide effect of the change in the width of the junction;

(c) means for applying a bias voltage across the junction;

(d) means for applying a modulating signal voltage across said junction whereby the first beam undergoes a phase change according to the signal as the beam propagates along the junction; and (e) means for combining said first beam after traveling along said junction with said second beam, in order to form a single modulated beam of light.

8. The system recited in claim 7 in which the bias voltage is a reverse bias voltage, the first beam of light is polarized in a direction parallel to the electric field in the junction produced by the reverse bias voltage, and the induced optic axis is also parallel to said electric field.

9. The system recited in claim 8 in which the second beam is polarized in a direction perpendicular to the direction in which the first beam is polarized.

10. The system recited in claim 8 in which the semiconductor member is essentially gallium phosphide.

11. The system recited in claim 10 in which the [111] direction of the semiconductor is parallel to the electric field produced in the junction by the reverse bias voltage.

12. The system recited in claim 7 including means for introducing a constant phase delay in the second beam.

References Cited

UNITED STATES PATENTS

| | | | |
|---|---|---|---|
| 2,385,086 | 9/1945 | D'Agostino et al. | 350—150 X |
| 3,158,746 | 11/1964 | Lehovec | 350—160 |
| 3,295,911 | 1/1967 | Ashkin et al. | 350—150 |
| 3,351,410 | 11/1967 | Ashkin | 350—161 |

DAVID SCHONBERG, Primary Examiner

PAUL R. MILLER, Assistant Examiner

U.S. Cl. X.R.

350—157, 160